US012803670B2

(12) United States Patent
Kaneko et al.

(10) Patent No.: US 12,803,670 B2
(45) Date of Patent: Nov. 17, 2026

(54) OPTICAL COMMUNICATION SYSTEM AND OPTICAL COMMUNICATION METHOD

(71) Applicant: NTT, Inc., Tokyo (JP)

(72) Inventors: Shin Kaneko, Musashino (JP); Takuya Kanai, Musashino (JP); Naotaka Shibata, Musashino (JP); Junichi Kani, Musashino (JP)

(73) Assignee: NTT, Inc., Tokyo (JP)

( * ) Notice: Subject to any disclaimer, the term of this patent is extended or adjusted under 35 U.S.C. 154(b) by 256 days.

(21) Appl. No.: 18/709,730

(22) PCT Filed: Nov. 18, 2021

(86) PCT No.: PCT/JP2021/042386
§ 371 (c)(1),
(2) Date: May 13, 2024

(87) PCT Pub. No.: WO2023/089724
PCT Pub. Date: May 25, 2023

(65) Prior Publication Data
US 2025/0007610 A1 Jan. 2, 2025

(51) Int. Cl.
*H04B 10/27* (2013.01)
*H04B 10/294* (2013.01)

(52) U.S. Cl.
CPC ........... *H04B 10/27* (2013.01); *H04B 10/294* (2013.01)

(58) Field of Classification Search
CPC .............................. H04B 10/27; H04B 10/294
(Continued)

(56) References Cited

U.S. PATENT DOCUMENTS 6,584,244 B2 6/2003 Hung
8,971,709 B2 3/2015 Liu et al.
(Continued)

FOREIGN PATENT DOCUMENTS

EP 1263257 A2 12/2002
JP 2005-257940 A 9/2005
(Continued)

OTHER PUBLICATIONS

Takuya Kanai et al., "Photonic Gateway for All-Photonics Network," B-8-20, p. 141, Mar. 2021, IEICE.
(Continued)

*Primary Examiner* — Dalzid E Singh

(57) ABSTRACT

An optical communication system including a subscriber device that performs optical connection with other subscriber device by End-End, and a management control device that controls each subscriber device, wherein the subscriber device includes an optical signal transmission unit configured to transmit an optical signal, an optical signal reception unit configured to receive an optical signal transmitted from the other subscriber device, and an output function unit configured to output an optical signal outputted by the optical signal transmission unit to an optical transmission line regardless of a wavelength and outputs an optical signal inputted from the optical transmission line to the optical signal reception unit regardless of the wavelength, and the management control device allocates wavelengths so that a transmission wavelength of the subscriber device becomes a reception wavelength of the other subscriber device and a transmission wavelength of the other subscriber device becomes a reception wavelength of the subscriber device.

3 Claims, 9 Drawing Sheets

(58) Field of Classification Search
USPC .......................................................... 398/204
See application file for complete search history.

(56) References Cited

U.S. PATENT DOCUMENTS

| | | | | |
|---|---|---|---|---|
| 10,097,907 | B2 * | 10/2018 | Dai | H04B 10/2587 |
| 10,797,799 | B2 * | 10/2020 | Nakagawa | H04J 14/0276 |
| 2002/0176658 | A1 | 11/2002 | Prohaska | |
| 2006/0153496 | A1 * | 7/2006 | Tanobe | H04Q 11/0062 385/24 |
| 2007/0286605 | A1 | 12/2007 | Feuer et al. | |
| 2008/0240720 | A1 | 10/2008 | Fujii | |
| 2009/0290873 | A1 | 11/2009 | Takita et al. | |
| 2011/0020001 | A1 | 1/2011 | Kim et al. | |
| 2012/0008945 | A1 | 1/2012 | Singla et al. | |
| 2012/0093514 | A1 | 4/2012 | Park et al. | |
| 2014/0294391 | A1 * | 10/2014 | Tamaki | H04J 14/0257 398/68 |
| 2020/0195365 | A1 | 6/2020 | Miyabe et al. | |
| 2021/0194617 | A1 * | 6/2021 | Seki | H04J 14/0241 |
| 2023/0030158 | A1 | 2/2023 | Kanai et al. | |

FOREIGN PATENT DOCUMENTS

| | | | |
|---|---|---|---|
| JP | 2005311708 | A | 11/2005 |
| JP | 2008244647 | A | 10/2008 |
| JP | 2008259131 | A | 10/2008 |
| JP | 2009284304 | A | 12/2009 |
| JP | 2011172133 | A | 9/2011 |
| JP | 2013153237 | A | 8/2013 |
| JP | 2015008437 | A | 1/2015 |
| WO | WO-2004073225 | A1 | 8/2004 |
| WO | 2012/126738 | A1 | 9/2012 |
| WO | WO-2021131202 | A1 | 7/2021 |

OTHER PUBLICATIONS

Kazuaki Honda et al., "Photonic Gateway for Direct and Protocol-Independent End-to-End User Connections," OFC2021.

Tsalamanis I et al: "Experimental demonstration of cascaded AWG access network featuring bi-directional transmission and polarization multiplexing", Optics Express, vol. 12, No. 5, Mar. 8, 2004 (Mar. 8, 2004), pp. 764-769, XP002499470, DOI: 10.1364/OPEX.12.000764.

* cited by examiner

OPTICAL COMMUNICATION SYSTEM AND OPTICAL COMMUNICATION METHOD

CROSS-REFERENCE TO RELATED APPLICATIONS

This application is a 371 U.S. National Phase of International Application No. PCT/JP2021/042386, filed on Nov. 18, 2021. The entire disclosure of the above application is incorporated herein by reference.

TECHNICAL FIELD

The present invention relates to an optical communication system and an optical communication method.

BACKGROUND ART

In a conventional optical communication system, a subscriber device must open an optical path for connection with a subscriber device to be a communication partner in order to perform communication. FIG. 6 and FIG. 7 are diagrams for describing an opening method of an optical path in the conventional optical communication system 100. As shown in FIG. 6, the conventional optical communication system 100 includes a plurality of subscriber devices 200-1 to 200-3, a plurality of subscriber devices 300-1 to 300-3, a plurality of control units 400-1 to 400-2, and a plurality of optical SWs 500-1 to 500-2.

Note that it is assumed that the subscriber device 200-1 is not connected to the optical SW 500-1, the subscriber devices 200-2 to 200-3 are connected to the optical SW 500-1 via optical transmission lines, and the subscriber devices 300-1 to 300-3 are connected to the optical SW 500-2 via optical transmission lines. The optical SW 500-1 and the optical SW 500-2 are connected via an optical communication NW 600 constituted by optical transmission lines. The control unit 400-1 manages the subscriber device 200 and controls the operation of the optical SW 500-1. The control unit 400-2 manages the subscriber device 300 and controls the operation of the optical SW 500-2.

When a user tries to start communication via the subscriber device 200-1, it is assumed that the subscriber device 200-1 is newly connected to the optical SW 500-1. At the initial connection of the subscriber device 200-1, the optical SW control unit 410 sets connection between ports of the optical SW 500-1 so that the subscriber device 200-1 communicates with a subscriber device management control unit 420. Thus, information required for registration and authentication of the subscriber device 200-1 can be exchanged between the subscriber device 200-1 and the subscriber device management control unit 420, and the emission wavelength used for transmission and reception can be instructed from the subscriber device management control unit 420 to the subscriber device 200-1. A control signal called an AMCC (Auxiliary Management and Control Channel) can be used as a signal for managing and controlling the subscriber device. The AMCC signal includes, for example, state information indicating a transmission and reception wavelength, transmission light intensity, temperature, and the like of an optical transmitter and receiver.

When the registration, authentication, wavelength setting, etc. of the subscriber device 200-1 are completed, the optical SW control unit 410 changes the setting of the inter-port connection of the optical SW 500-1 so that the optical signal transmitted from the subscriber device 200-1 is transferred to the subscriber device 300 (for example, the subscriber device 300-1) to be the communication partner. Similarly, the control unit 400-2 changes the setting of the inter-port connection of the optical SW 500-2 so that the optical signal transmitted from the subscriber device 200-1 is transferred to the subscriber device 300 (for example, the subscriber device 300-1) to be the communication partner. Thus, as shown in FIG. 7, the optical path connecting the subscriber device 200-1 and the subscriber device 300-1 can be opened.

CITATION LIST

Non Patent Literature

[NPL 1] Takuya Kanai, Kazuaki Honda, Yasunari Tanaka, Shin Kaneko, Kazutaka Hara, Junichi Kani, Tomoaki Yoshida, "Photonic Gateway for All-Photonics Network", The Institute of Electronics, Information and Communication Engineers General Conference, B-8-20, March 2021.

SUMMARY OF INVENTION

Technical Problem

A conventional communication network generally is constituted by, as shown in FIG. 8, an access network (access NW), a metro network (metro NW), and a core network (core NW), and has an architecture that hierarchically connects these networks. In the conventional communication network, optical signals are once converted into electrical signals at each of a boundary between the access network and the metro network and a boundary between the metro network and the core network, and line concentration and multiplexing are performed to carry many users and services by using more wider band optical paths.

In the conventional optical access system for connecting a subscriber device (ONU (Optical Network Unit)) and an accommodation device (OLT: Optical Line Terminal) in an accommodation building, in many cases, single-fiber bi-directional transmission in which an uplink optical signal and a downlink optical signal are directional-multiplexed by WDM (Wavelength Division Multiplexing) is used in order to achieve economic efficiency. Here, since it is not assumed that the optical path is once terminated at the boundary between the access network and the metro network and the subscriber devices under the same accommodation device directly communicate with each other as described above, it is difficult to consider that the transmission wavelength of a certain subscriber device becomes the reception wavelength of another subscriber device.

Therefore, as shown in FIG. 9, by using a wavelength demultiplexing unit having different wavelength ranges passing between the ports, it is possible to realize a single type of optical transceivers for the single-fiber bi-directional transmission of the subscriber device. FIG. 9 is a diagram showing a configuration example of the conventional subscriber device 200 having an optical transceiver for single-fiber bi-directional transmission. Note that the subscriber device 300 also includes the optical transceiver shown in FIG. 9. The wavelength demultiplexing unit has a passing characteristic as shown in a blow-off of FIG. 9, and has a function of multiplexing or demultiplexing optical signals of different wavelengths with a certain wavelength as a boundary. FIG. 9 shows an example in which the passing wavelength (alternate long and short dash line) of the transmission port on the short wavelength side and the passing wavelength (solid line) of the reception port on the long wavelength side are described. FIG. 10 is a diagram for describing a problem in the conventional optical communication system.

When the optical transceiver shown in FIG. 9 is used to open an optical path for communicably connecting the subscriber device 200-1 accommodated in the optical SW 500-1 and the subscriber device 300-1 accommodated in the optical SW 500-2 as shown in FIG. 10, the subscriber device 300-1 cannot receive the optical signal transmitted by the subscriber device 200-1 since the optical signal transmitted by the subscriber device 200-1 is not passed by the wavelength demultiplexing unit in the optical transceiver of the subscriber device 300-1.

Similarly, the subscriber device 200-1 cannot receive the optical signal transmitted by the subscriber device 300-1. Similarly, when an optical path for communicably connecting the subscriber device 200-2 and the subscriber device 200-3 accommodated in the optical SW 500-1 is opened, the subscriber device 200-2 and the subscriber device 200-3 cannot receive the optical signal from the opposite device.

If the wavelength passing characteristics of the wavelength demultiplexing units in the optical transceivers of the opposite subscriber devices are made opposite to each other, communication between the opposite subscriber devices becomes possible, but the optical transceivers cannot be made into the single type. Further, communication can be performed only between subscriber devices in which the wavelength passing characteristics of the wavelength demultiplexing units in the optical transceiver of the subscriber device are opposite to each other. As described above, there has been a problem that optical connection cannot be realized between arbitrary subscriber devices by End-End by using the optical transceiver for the single type of subscriber device.

In view of the above circumstances, the present invention is intended to provide a technique capable of realizing optical connection between arbitrary subscriber devices by End-End by using the optical transceiver for the single type of subscriber device.

Solution to Problem

An aspect of the present invention is an optical communication system including a subscriber device that performs optical connection with other subscriber device by End-End, and a management control device that controls each subscriber device, wherein the subscriber device includes an optical signal transmission unit that transmits an optical signal, an optical signal reception unit that receives an optical signal transmitted from the other subscriber device, and an output function unit that outputs an optical signal outputted by the optical signal transmission unit to an optical transmission line regardless of a wavelength and outputs an optical signal inputted from the optical transmission line to the optical signal reception unit regardless of the wavelength, and the management control device allocates wavelengths so that a transmission wavelength of the subscriber device becomes a reception wavelength of the other subscriber device and a transmission wavelength of the other subscriber device becomes a reception wavelength of the subscriber device.

An aspect of the present invention is an optical communication method in an optical communication system including a subscriber device and a management control device that optically connects the subscriber device and other communicating subscriber device by End-End and controls each subscriber device, wherein the management control device allocates wavelengths so that a transmission wavelength of the subscriber device becomes a reception wavelength of the other subscriber device and a transmission wavelength of the other subscriber device becomes a reception wavelength of the subscriber device, and the subscriber device outputs an optical signal to an optical transmission line regardless of a wavelength, the other subscriber device receives the optical signal transmitted from the subscriber device via the optical transmission line, and the other subscriber device outputs the optical signal inputted from the optical transmission line to an optical signal reception unit regardless of the wavelength.

Advantageous Effects of Invention

According to the present invention, the optical connection between arbitrary subscriber devices by End-End can be realized by using the optical transceiver for the single type of subscriber device.

DESCRIPTION OF EMBODIMENTS

An embodiment of the present invention will be described below with reference to the drawings.

Figure 1:
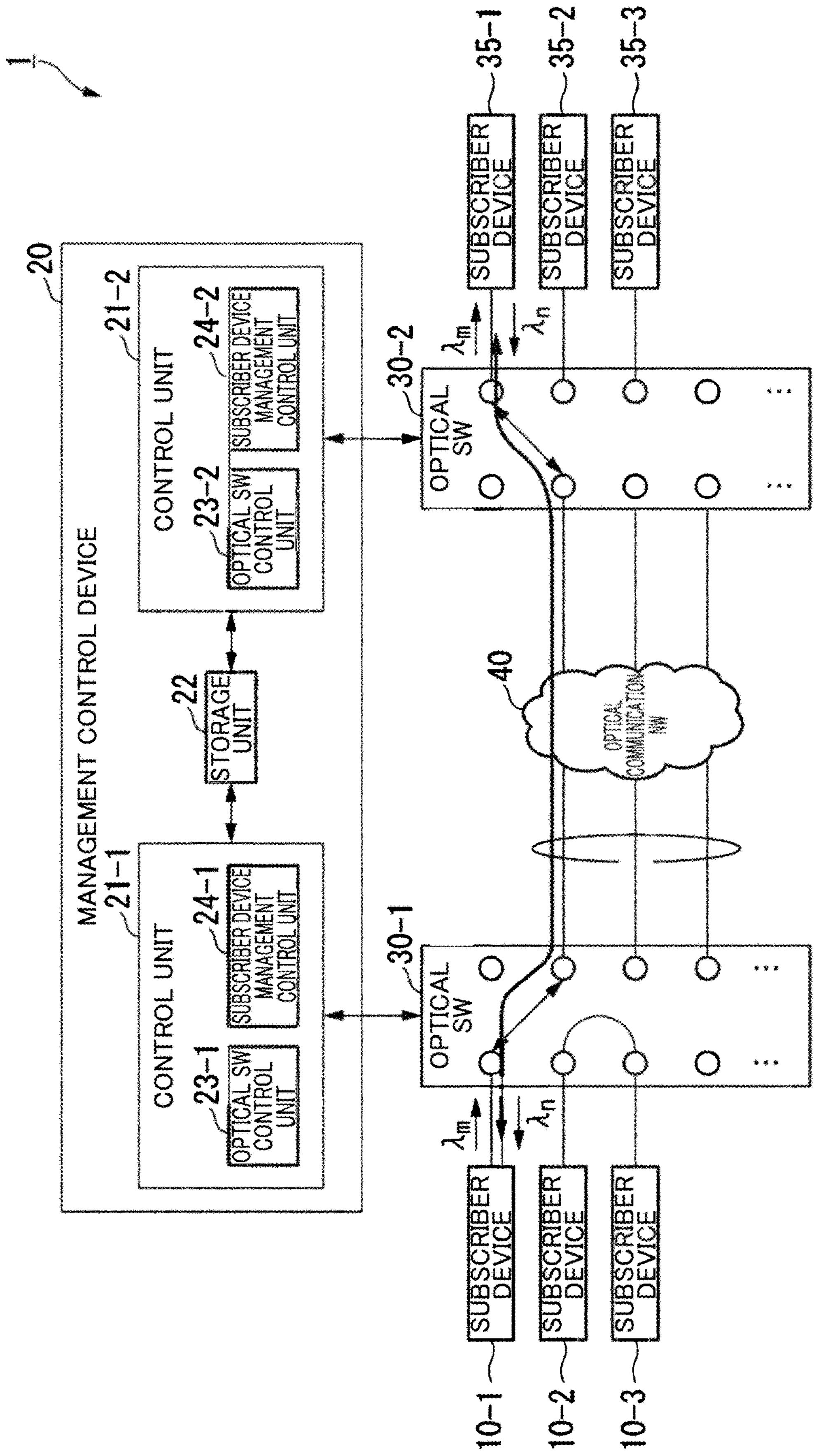
FIG. 1 is a diagram showing a configuration example of an optical communication system according to an embodiment.

FIG. 1 is a diagram showing a configuration example of an optical communication system 1 according to the embodiment. The optical communication system 1 includes one or more subscriber devices 10 (e.g., subscriber devices 10-1 to 10-3), one or more subscriber devices 35 (e.g., subscriber devices 35-1 to 35-3), a management control device 20, and a plurality of optical SWs 30-1 to 30-2. The subscriber device 10 and the optical SW 30-1 are connected, the optical SW 30-1 and the optical SW 30-2 are connected, and the optical SW 30-2 and the subscriber device 35 are connected by using optical transmission lines. The optical transmission line is, for example, an optical fiber. Between the optical SW 30-1 and the optical SW 30-2, an optical communication NW 40 is constituted.

The subscriber device 10 includes an optical transceiver. The subscriber device 10 transmits and receives an optical signal by the optical transceiver. The subscriber device 10 is an ONU installed on a subscriber's house side, for example.

The subscriber device 35 is a device that communicates with the subscriber device 10. The subscriber device 35 includes the optical transceiver. The subscriber device 35 transmits and receives the optical signal by the optical transceiver. The subscriber device 35 is an ONU installed on a subscriber's house side, for example.

The optical SWs 30-1 to 30-2 have M (M is an integer of 2 or more) first ports and N (N is an integer of 2 or more) second ports. In the embodiment, the number of M and N is described as 4. Optical signals inputted to certain ports of the optical SWs 30-1 to 30-2 are outputted from other ports. For example, the optical signal inputted to the first port of the optical SW 30 is outputted from the second port.

In an example shown in FIG. 1, the subscriber device 10 is connected to the first port of the optical SW 30-1 via the optical transmission line, and the optical SW 30-2 is connected to the second port of the optical SW 30-1 via the optical transmission line. In an example shown in FIG. 1, the subscriber device 35 is connected to the first port of the optical SW 30-2 via the optical transmission line, and the optical SW 30-1 is connected to the second port of the optical SW 30-2 via the optical transmission line.

The management control device 20 at least controls the subscriber devices 10 and 35 and controls the optical SW 30. Here, the control of the subscriber devices 10 and 35 is, for example, allocation of emission wavelengths to the subscriber devices 10 and 35, instruction of light stop, instruction of wavelength change, and the like. The control of the optical SW 30 is, for example, connection switching between ports of the optical SW 30 and setting of optical paths.

The management control device 20 includes a plurality of control units 21 (for example, control units 21-1 to 21-2) and a storage unit 22. Each control unit 21 controls each optical SW 30 and a subscriber device 10 or 35 accommodated in each optical SW 30. For example, the control unit 21-1 controls the optical SW 30-1 and the subscriber device 10 accommodated in the optical SW 30-1. For example, the control unit 21-2 controls the optical SW 30-2 and the subscriber device 35 accommodated in the optical SW 30-2.

The control unit 21-1 includes an optical SW control unit 23-1 and a subscriber device management control unit 24-1. The control unit 21-2 is constituted by the optical SW control unit 23-2 and the subscriber device management control unit 24-2. Since the control unit 21-1 and the control unit 21-2 perform the same processing except that the control object is different, the optical SW control unit 23 and the subscriber device management control unit 24 will be described without distinction.

The optical SW control unit 23 sets and switches connection between ports of the optical SW 30 and sets the optical paths. For example, in the optical communication system 1, when the optical path is opened by End-End, the subscriber devices 10 and 35 have a configuration shown in FIG. 2 or FIG. 3. A configuration of the subscriber devices 10 and 35 will be described below.

As shown in FIG. 1, when opening the optical path for communicably connecting the subscriber device 10-1 accommodated in the optical SW 30-1 and the subscriber device 35-1 accommodated in the optical SW 30-2, the management control device 20 allocates wavelengths to the optical paths in End-End so that a transmission wavelength ($\lambda_m$) of the subscriber device 10-1 becomes a reception wavelength of the subscriber device 35-1, and a transmission wavelength ($\lambda_n$) of the subscriber device 35-1 becomes a reception wavelength of the subscriber device 10-1.

Similarly, when opening the optical path for communicably connecting the subscriber device 10-2 and the subscriber device 10-3 accommodated in the optical SW 30-1, the management control device 20 allocates wavelengths to the optical paths in End-End so that a transmission wavelength ($\lambda_h$) of the subscriber device 10-2 becomes a reception wavelength of the subscriber device 10-3 and a transmission wavelength ($\lambda_k$) of the subscriber device 10-3 becomes a reception wavelength of the subscriber device 10-2.

When a subscriber device is newly connected to the optical SW 30, the subscriber device management control unit 24 specifies to which port of the optical SW 30 the subscriber device newly connected to the optical SW 30 is connected, and performs processing of opening the optical path such as the wavelength instruction to the subscriber device. Note that since the optical path opening processing in the subscriber device management control unit 24 is the same as the conventional one, the description thereof will be omitted. A function of the optical SW control unit 23 and the subscriber device management control unit 24 may be realized by causing one or more processors to perform programs.

The storage unit 22 stores subscriber information. The subscriber information is information related to the subscriber devices 10 and 35. The subscriber information includes, for example, information indicating to which port of the optical SW 30 the subscriber devices 10 and 35 are connected, and information on wavelengths allocated to the subscriber devices 10 and 35.

Figure 2:
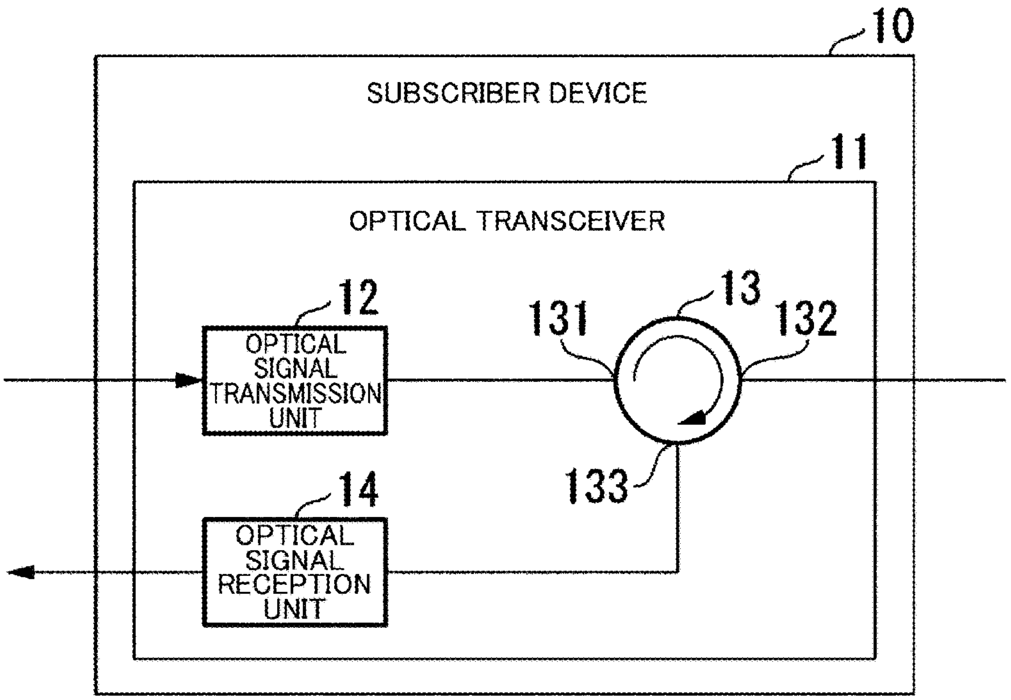
FIG. 2 is a diagram showing a configuration example (part 1) of a subscriber device according to the embodiment.

FIG. 2 is a diagram showing a configuration example (part 1) of the subscriber devices 10 and 35 according to the embodiment. Note that since the subscriber devices 10 and 35 have similar configurations, the subscriber device 10 will be described as an example in FIG. 2. The subscriber device 10 includes an optical transceiver 11. The optical transceiver 11 is constituted by an optical signal transmission unit (optical signal transmitter) 12, a circulator 13, and an optical signal reception unit (optical signal receiver) 14.

The optical signal transmission unit 12 transmits the optical signal of the wavelength allocated by the management control device 20 via the circulator 13.

The circulator 13 has a first port 131, a second port 132, and a third port 133. The first port 131 of the optical circulator 13 is connected to the optical signal transmission unit 12. The second port 132 of the optical circulator 13 is connected to the optical transmission line. The third port 133 of the optical circulator 13 is connected to the optical signal reception unit 14. The optical signal inputted to the first port 131 is outputted from the second port 132. The optical signal inputted to the second port 132 is outputted from the third port 133.

Thus, the circulator 13 has directivity and port selectivity, but has no wavelength selectivity. Thus, the optical signal outputted from the optical signal transmission unit 12 can be outputted to the optical transmission line regardless of the wavelength of the optical signal. Further, the circulator 13 can transfer the optical signal inputted from the optical transmission line to the optical signal reception unit 14 regardless of the wavelength of the optical signal. Furthermore, the directivity and port selectivity of the circulator 13 can prevent the optical signal inputted from the optical transmission line from being inputted to the optical signal transmission unit 12. The circulator 13 is an aspect of an output function unit (outputter).

The optical signal reception unit 14 receives the optical signal transferred from the circulator 13. For example, the optical signal reception unit 14 is a PD (Photo Diode) or the like.

Figure 3:
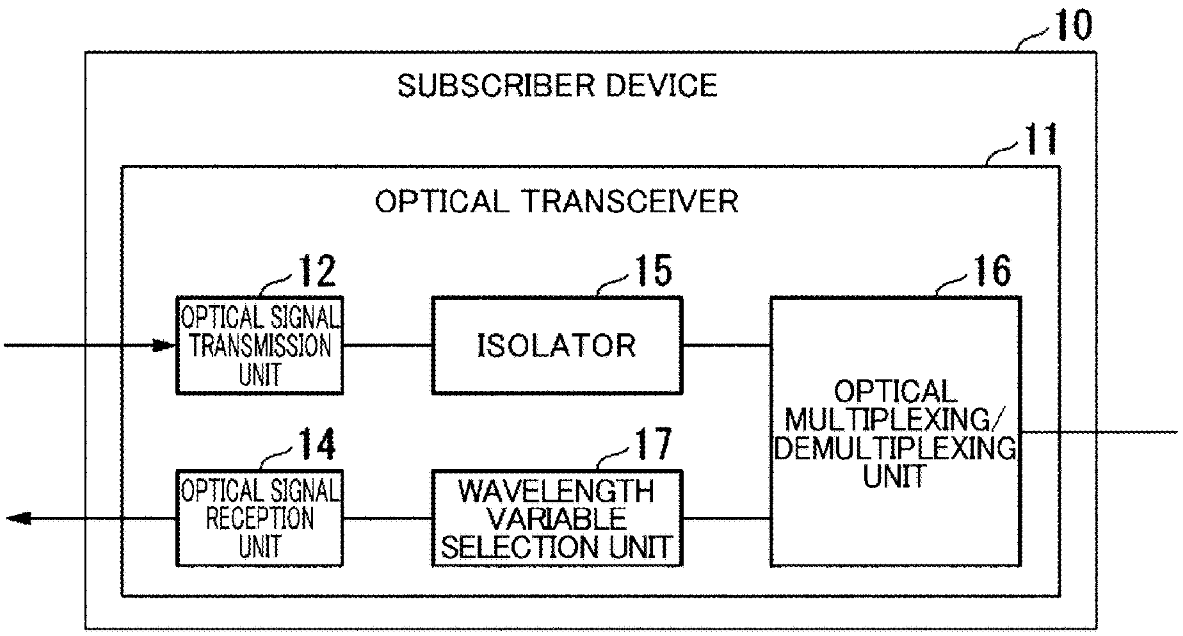
FIG. 3 is a diagram showing a configuration example (part 2) of the subscriber device according to the embodiment.

FIG. 3 is a diagram showing a configuration example (part 2) of the subscriber devices 10 and 35 according to the embodiment. Note that since the subscriber devices 10 and 35 have similar configurations, the subscriber device 10 will be described as an example in FIG. 3. The subscriber device 10 includes an optical transceiver 11. The optical transceiver 11 is constituted by an optical signal transmission unit 12, an optical signal reception unit 14, an isolator 15, an optical multiplexing/demultiplexing unit 16, and a wavelength variable selection unit (wavelength variable selector) 17. Note that the same numerals are assigned to the configuration described in FIG. 2 and the description will be omitted.

The isolator 15 is a signal insulator which has directivity and passes the optical signal outputted from the optical signal transmission unit 12 to the optical multiplexing/demultiplexing unit 16, and cuts off the input of the optical signal outputted from the optical multiplexing/demultiplexing unit 16. That is, the isolator 15 has a function of passing the optical signal in a first direction from the optical signal transmission unit 12 to the optical multiplexing/demultiplexing unit 16 and cutting off the optical signal in a second direction from the optical multiplexing/demultiplexing unit 16 to the optical signal transmission unit 12. Note that when the optical signal transmission unit 12 includes an isolator function, the subscriber device 10 does not need to include the isolator 15.

The optical multiplexing/demultiplexing unit 16 has a function of multiplexing and branching the inputted optical signal. For example, the optical multiplexing/demultiplexing unit 16 multiplexes the optical signal inputted from the first port to which the isolator 15 is connected and the second port to which the wavelength variable selection unit 17 is connected, outputs the multiplexed optical signal to the third port to which the optical transmission line is connected, branches the optical signal inputted from the third port, and output the branched optical signal to the first port and the second port. The optical multiplexing/demultiplexing unit 16 is an aspect of the output function unit.

The subscriber device 10 includes the optical multiplexing/demultiplexing unit 16, so that the optical signal outputted from the optical signal transmission unit 12 can be outputted to the optical transmission line regardless of the wavelength of the optical signal. Further, the subscriber device 10 includes the optical multiplexing/demultiplexing unit 16, so that the optical signal inputted from the optical transmission line can be transferred to the wavelength variable selection unit 17 regardless of the wavelength of the optical signal. As the optical multiplexing/demultiplexing unit 16, an optical coupler constituted by an optical fiber, a PLC (Planar Lightwave Circuit) or the like can be cited.

The wavelength variable selection unit 17 passes only the optical signal having a wavelength in the set wavelength range. In the case of single-fiber bi-directional transmission, the wavelength of the optical signal outputted from the optical signal transmission unit 12 is different from the wavelength of the optical signal received by the optical signal reception unit 14. Therefore, by including the wavelength variable selection unit 17, the optical signal which is returned to the optical transceiver 11 due to reflection in the optical transmission line and outputted from the optical signal transmission unit 12 is cut off, and deterioration of reception characteristic can be avoided.

Figure 4:
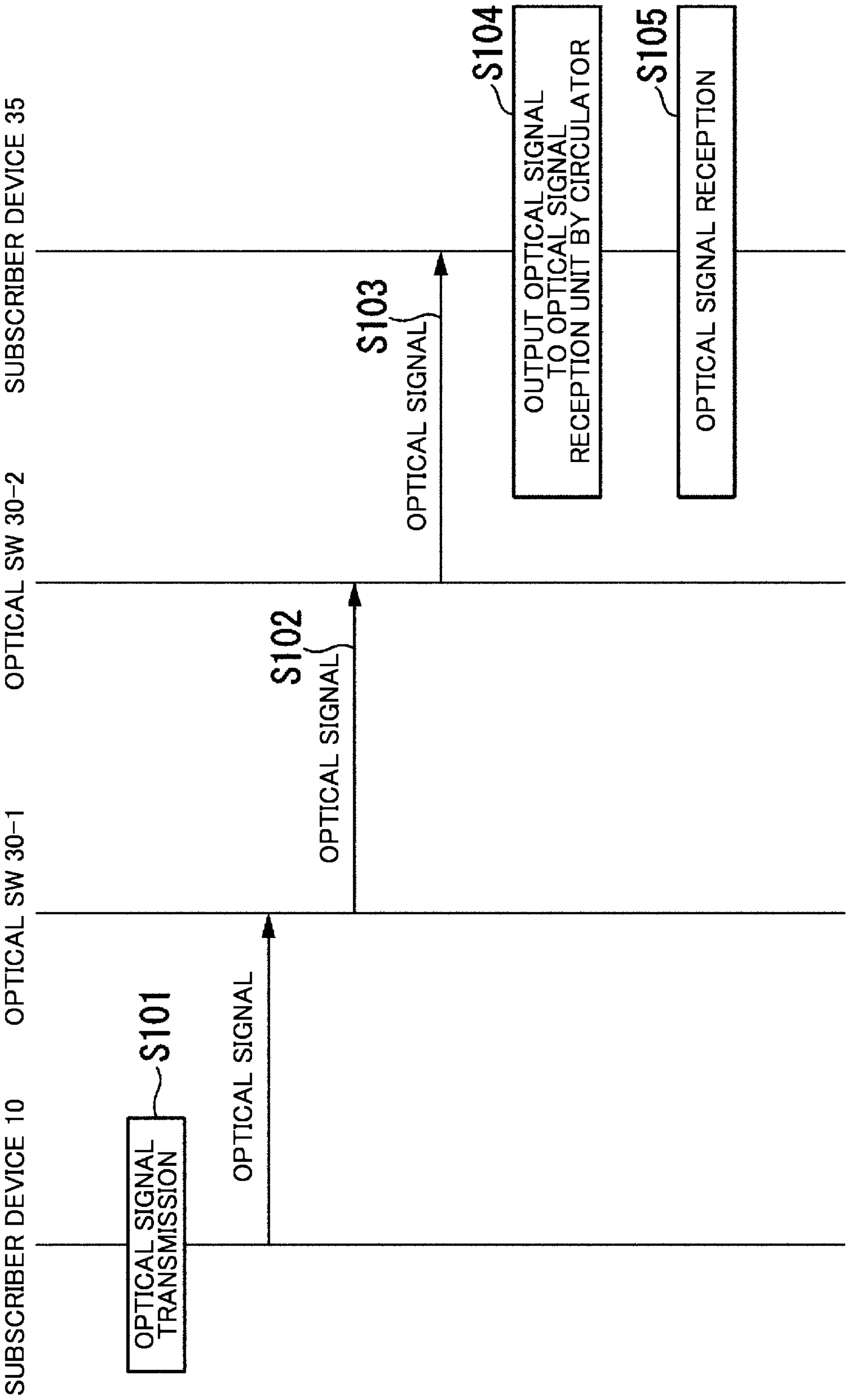
FIG. 4 is a sequence diagram (part 1) showing a flow of processing of the optical communication system according to the embodiment.

FIG. 4 is a sequence diagram (part 1) showing a flow of processing of the optical communication system 1 according to the embodiment. In the description of FIG. 4, the case where the subscriber devices 10 and 35 have the configuration shown in FIG. 2 will be described. Further, at the start of the processing in FIG. 4, the connection relation between the ports of the optical SWs 30-1 and 30-2 is set to be the connection relation shown in FIG. 1.

The optical signal transmission unit 12 of the subscriber device 10 generates the optical signal (step S101). The optical signal outputted from the optical signal transmission unit 12 is inputted to the first port 131 of the circulator 13. The optical signal inputted to the first port 131 of the circulator 13 is outputted from the second port 132 to the optical transmission line. The optical signal outputted from the subscriber device 10 in this way is inputted to the first port of the optical SW 30-1 via the optical transmission line.

The optical signal inputted to the first port of the optical SW 30-1 is outputted from the second port to which the first port is connected. The optical signal outputted from the second port of the optical SW 30-1 is inputted to the second port of the optical SW 30-2 (step S102). The optical signal inputted to the second port of the optical SW 30-2 is outputted from the first port to which the second port is connected. The optical signal outputted from the first port of the optical SW 30-2 is inputted to the subscriber device 35 (step S103).

The optical signal inputted to the second port of the circulator of the subscriber device 35 is outputted from the third port of the circulator to the optical signal reception unit (step S104). The optical signal reception unit of the subscriber device 35 receives the inputted optical signal (step S105).

Figure 5:
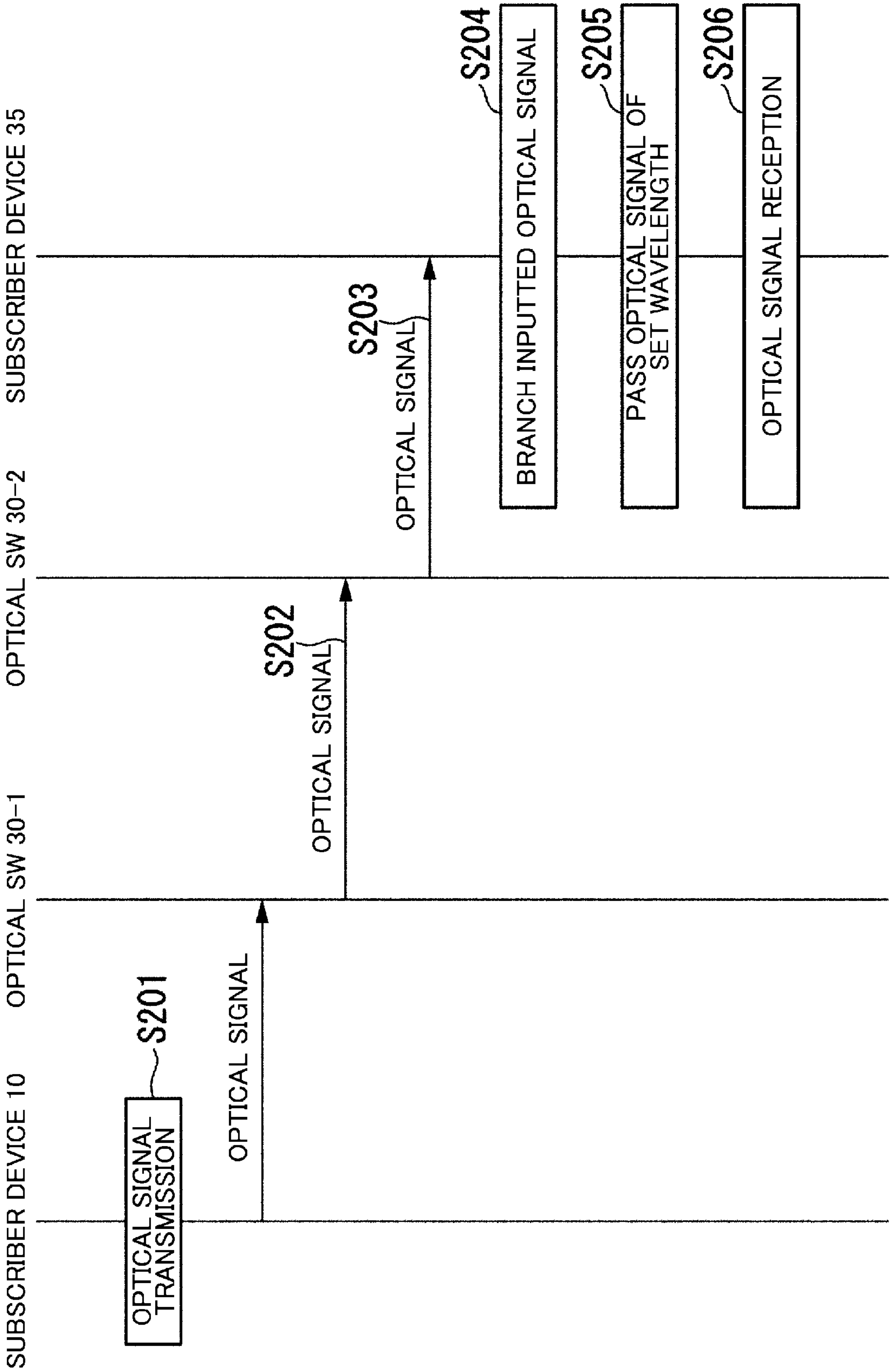
FIG. 5 is a sequence diagram (part 2) showing a flow of processing of the optical communication system according to the embodiment.
Figure 6:
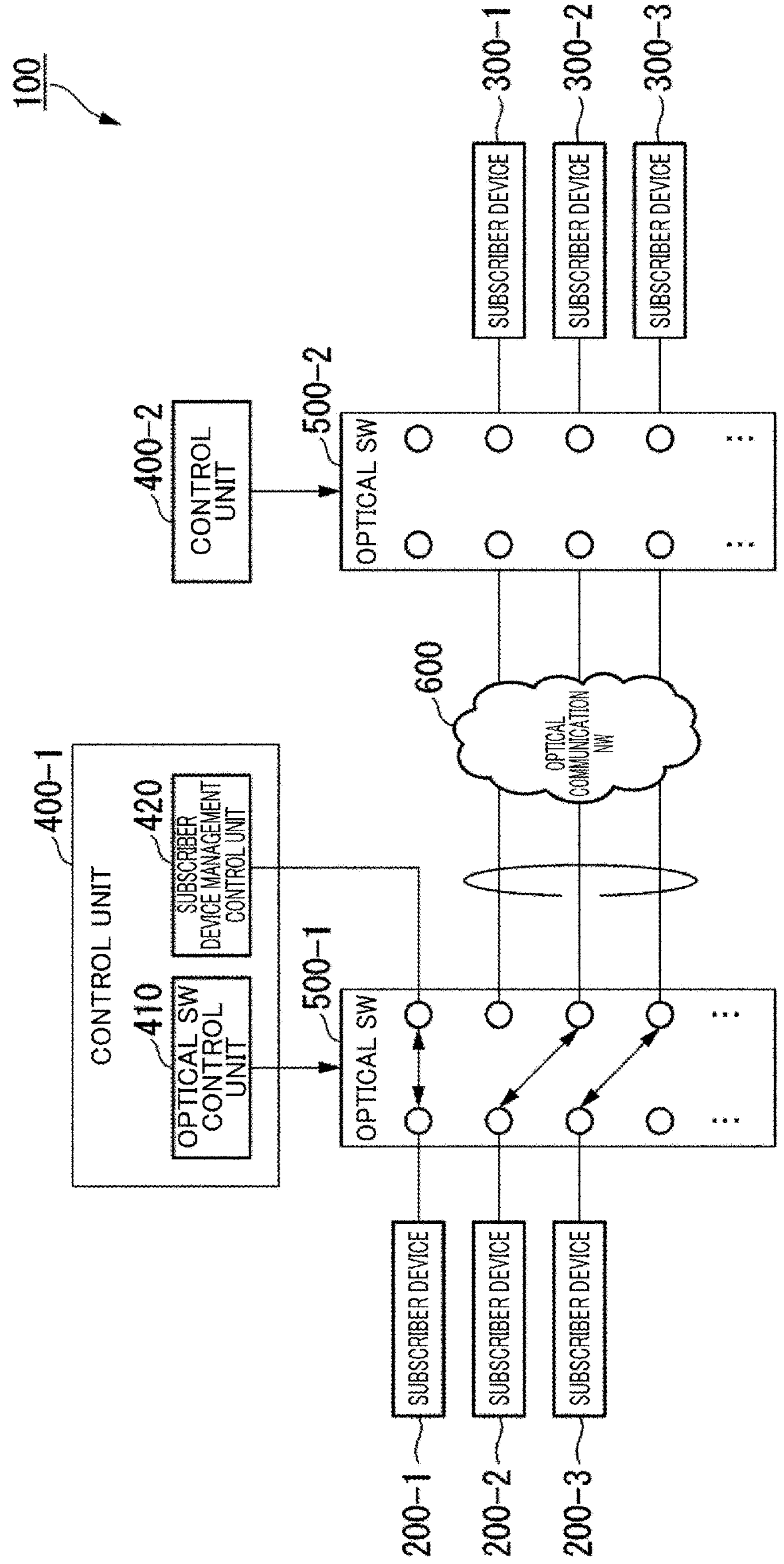
FIG. 6 is a diagram for describing an opening method of an optical path in a conventional optical communication system.
Figure 7:
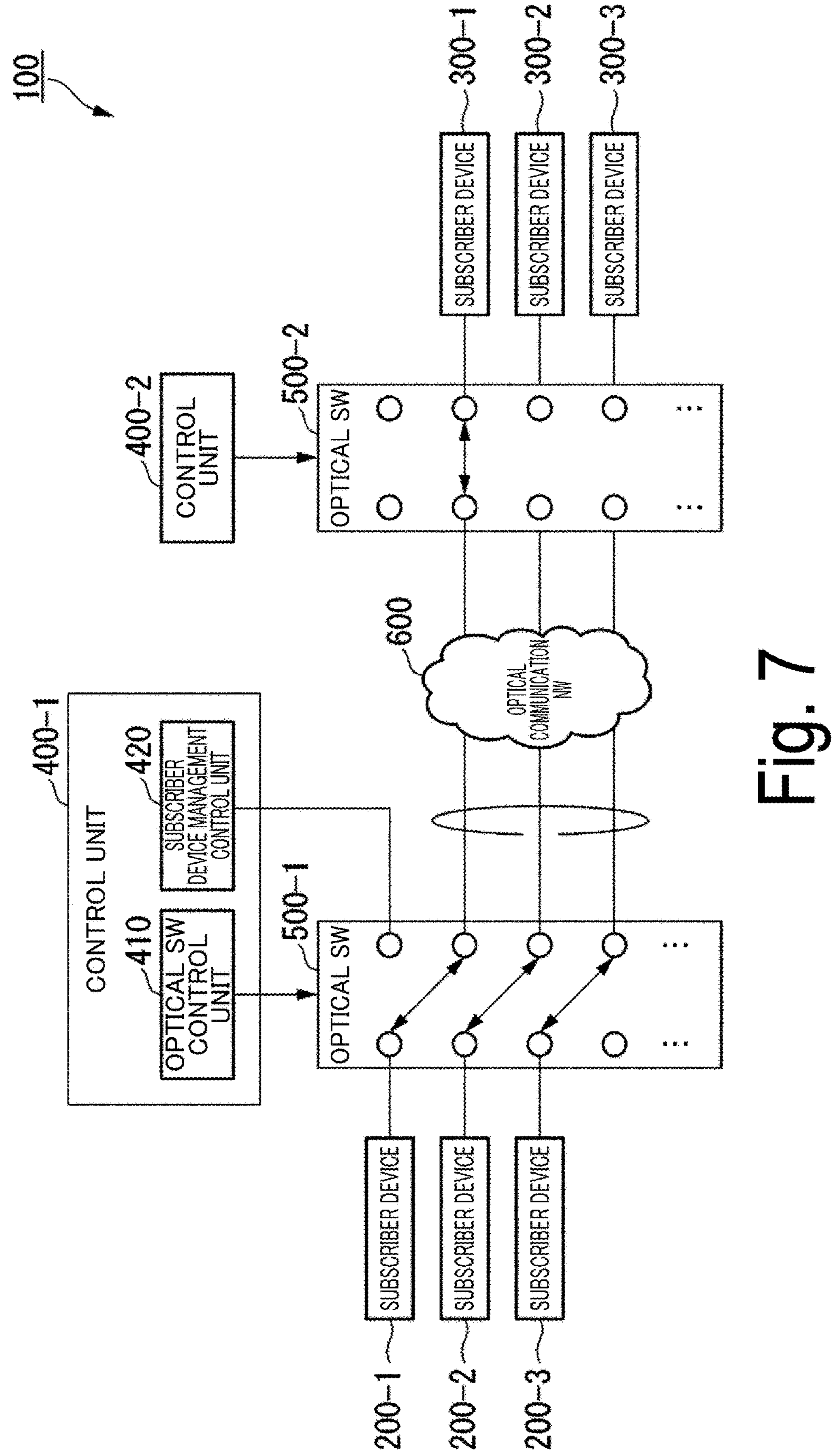
FIG. 7 is a diagram for describing the opening method of the optical path in the conventional optical communication system.
Figure 8:
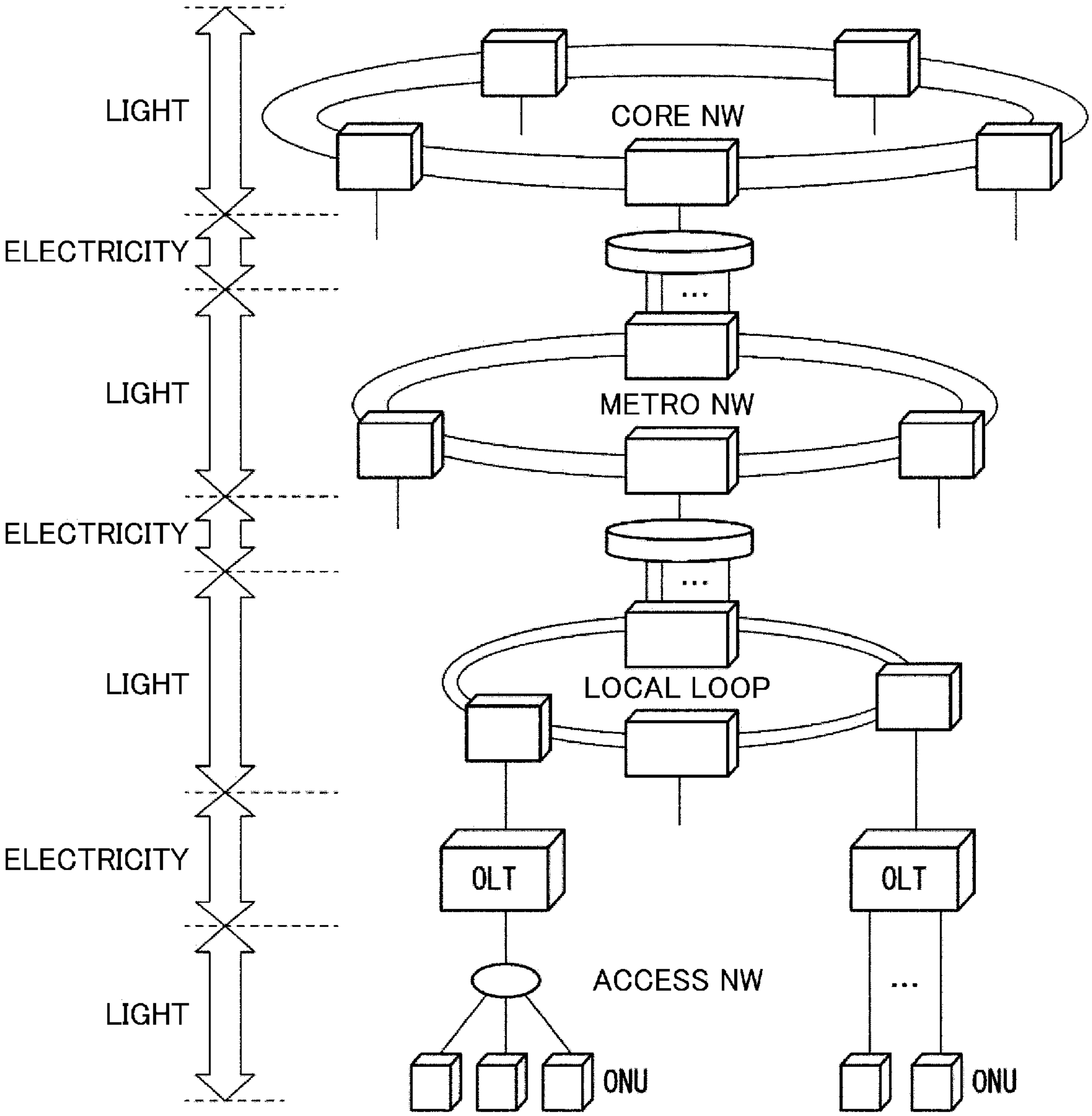
FIG. 8 is a diagram for describing an architecture of a conventional communication network.
Figure 9:
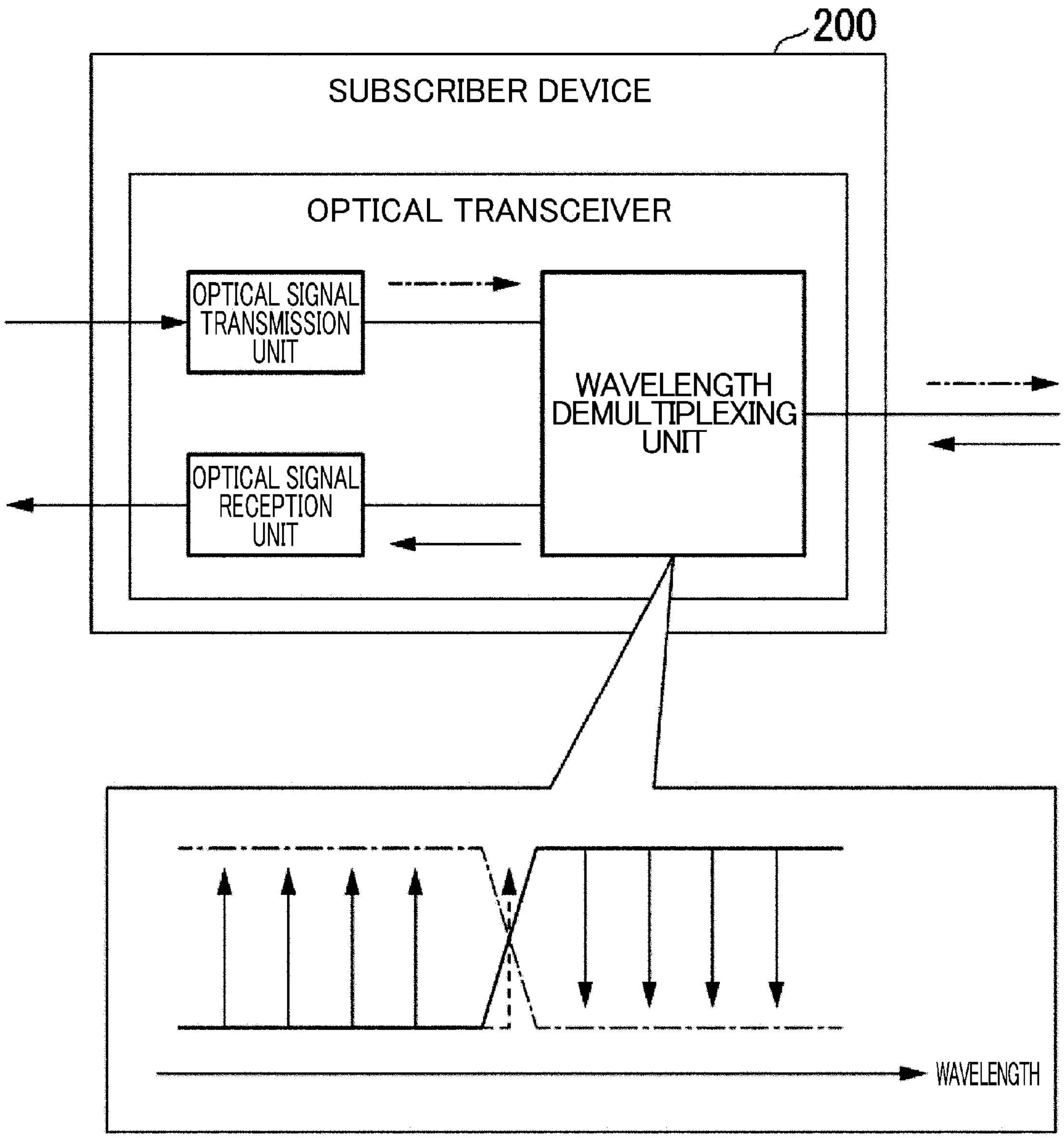
FIG. 9 is a configuration example of a conventional subscriber device having an optical transceiver for single-fiber bi-directional transmission.
Figure 10:
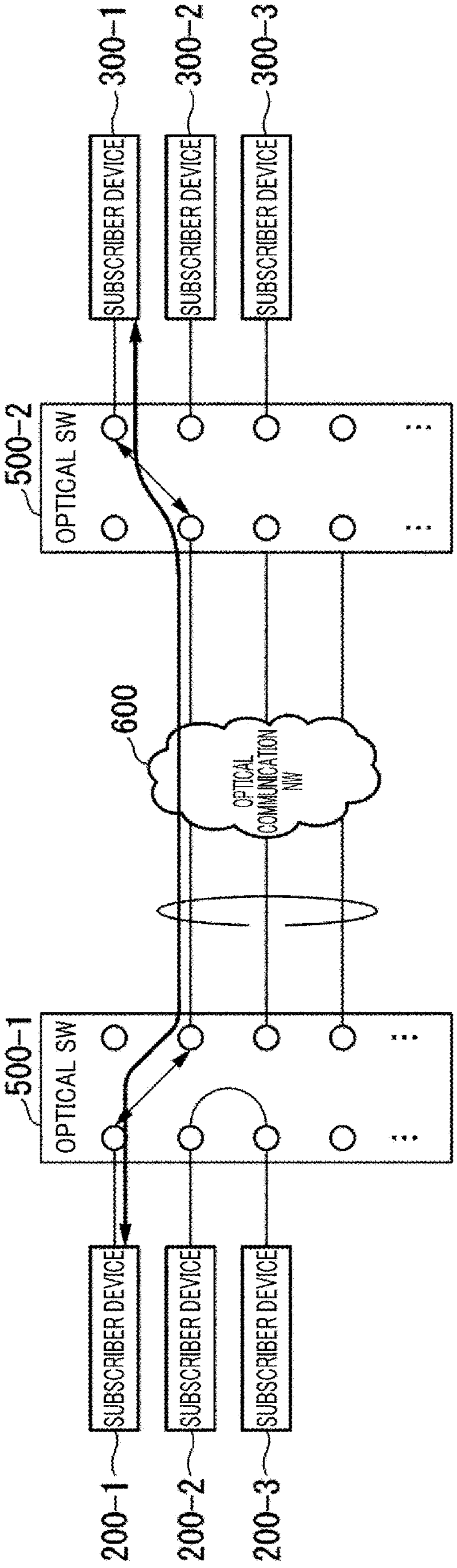
FIG. 10 is a diagram for describing a problem in the conventional optical communication system.

FIG. 5 is a sequence diagram (part 2) showing a flow of processing of the optical communication system 1 according to the embodiment. In the description of FIG. 5, the case where the subscriber devices 10 and 35 have the configuration shown in FIG. 3 will be described. Further, at the start of the processing in FIG. 5, the connection relation between the ports of the optical SWs 30-1 and 30-2 is set to be the connection relation shown in FIG. 1.

The optical signal transmission unit 12 of the subscriber device 10 outputs the optical signal (step S201). The optical signal outputted from the optical signal transmission unit 12 is inputted to the optical multiplexing/demultiplexing unit 16 via the isolator 15. The optical signal inputted to the optical multiplexing/demultiplexing unit 16 is multiplexed and outputted to the optical transmission line. The optical signal outputted from the subscriber device 10 in this way is inputted to the first port of the optical SW 30-1 via the optical transmission line.

The optical signal inputted to the first port of the optical SW 30-1 is outputted from the second port to which the first port is connected. The optical signal outputted from the second port of the optical SW 30-1 is inputted to the second port of the optical SW 30-2 (step S202). The optical signal inputted to the second port of the optical SW 30-2 is outputted from the first port to which the second port is connected. The optical signal outputted from the first port of the optical SW 30-2 is inputted to the subscriber device 35 (step S203).

The optical signal inputted to the optical multiplexing/demultiplexing unit of the subscriber device 35 is branched and outputted to the isolator and the wavelength variable selection unit (step S204). The optical signal outputted to the isolator is cut off. The wavelength variable selection unit passes the optical signal having a wavelength in the set wavelength range (step S205). When the optical signal inputted to the wavelength variable selection unit is an optical signal having a wavelength outside the wavelength range set in the wavelength variable selection unit, the wavelength variable selection unit does not pass the inputted optical signal. The optical signal reception unit of the subscriber device 35 receives the inputted optical signal (step S206).

According to the optical communication system 1 constituted as described above, it is possible to realize optical connection between arbitrary subscriber devices by End-End by using the optical transceiver for the single type of subscriber device. Specifically, in the optical communication system 1, each of subscriber devices 10 and 35 installed in End-End can output the optical signal outputted from the optical signal transmission unit to the optical transmission line regardless of a wavelength as the optical transceiver for the subscriber device, and includes a function capable of transferring the optical signal inputted from the optical transmission line to the optical signal reception unit regardless of the wavelength. In addition, the management control device 20 included in the optical communication system 1 allocates wavelengths so that a transmission wavelength of the subscriber device 10 becomes a reception wavelength of the subscriber device 35 and a transmission wavelength of the subscriber device 35 becomes a reception wavelength of the subscriber device 10. Thus, optical connection between arbitrary subscriber devices by End-End can be realized by using the optical transceiver for the single type of subscriber device.

In the optical communication system 1, each of the subscriber devices 10 and 35 installed in End-End includes the circulator as the optical transceiver for the subscriber device, as shown in FIG. 2. In this way, since each of the subscriber devices 10 and 35 includes the circulator, by the function of directivity and port selectivity of the circulator, the optical signal outputted from the optical signal transmission unit can be outputted to the optical transmission line regardless of the wavelength of the optical signal, and the optical signal inputted from the optical transmission line can be transferred to the optical signal reception unit regardless of the wavelength of the optical signal. Thus, optical connection between arbitrary subscriber devices by End-End can be realized by using the optical transceiver for the single type of subscriber device.

In the optical communication system 1, each of the subscriber devices 10 and 35 installed in End-End includes the optical multiplexing/demultiplexing unit, the isolator, and the wavelength variable selection unit as the optical transceiver for the subscriber device, as shown in FIG. 3. In this way, since each of the subscriber devices 10 and 35 includes the optical multiplexing/demultiplexing unit, the isolator, and the wavelength variable selection unit, the optical signal outputted from the optical signal transmission unit can be outputted to the optical transmission line regardless of the wavelength of the optical signal, and the optical signal inputted from the optical transmission line can be transferred to the optical signal reception unit regardless of the wavelength of the optical signal. Thus, optical connection between arbitrary subscriber devices by End-End can be realized by using the optical transceiver for the single type of subscriber device.

Some functions of the subscriber devices 10 and 35 and the management control device 20 according to the above-described embodiment may be realized by a computer. In such a case, a program for realizing this function is recorded on a computer-readable recording medium, the program recorded on the recording medium is read and executed by the computer system, and this function may be realized. Note that "computer system" includes an OS (Operating System) and hardware such as peripheral devices.

In addition, "computer-readable recording medium" refers to a portable medium such as a flexible disk, a magneto-optical disc, a ROM (Read Only Memory), or a CD-ROM, or a storage device such as a hard disk built into the computer system. In addition, "computer-readable recording medium" may also include a recording medium that dynamically retains a program for a short period of time, such as a communication line used to transmit the program via a network such as Internet or a communication line such as a telephone line and a recording medium that retains the program for a certain period of time, such as volatile memory installed within the computer system that serves as the server or client in that case. Further, the program described above may be any of a program for realizing some of the functions described above, a program capable of realizing the functions described above in combination with a program already recorded in the computer system, and a program that is realized by using a programmable logic device such as an FPGA (Field Programmable Gate Array).

Although the embodiment of the present invention has been described in detail with reference to the drawings, a specific configuration is not limited to this embodiment, and design within the scope of the gist of the present invention, and the like are included.

INDUSTRIAL APPLICABILITY

The present invention is applicable to the optical communication system for setting the optical path by End-End.

REFERENCE SIGNS LIST

10, 35 Subscriber device
11 Optical transceiver
12 Optical signal transmission unit
13 Circulator
14 Optical signal reception unit
15 Isolator
16 Optical multiplexing/demultiplexing unit
17 Wavelength variable selection unit
20 Management control device
21-1, 21-2 Control unit
22 Storage unit
23-1, 23-2 Optical SW control unit
24-1, 24-2 Subscriber device management control unit
30-1, 30-2 Optical SW
40 Optical communication NW

The invention claimed is:

1. An optical communication system comprising a subscriber device that performs optical connection with other subscriber device by End-End, and a management control device that controls each subscriber device, wherein the subscriber device comprises an optical signal transmitter configured to transmit an optical signal, an optical signal receiver configured to receive an optical signal transmitted from the other subscriber device, and an outputter configured to output the optical signal outputted by the optical signal transmitter to an optical transmission line regardless of a wavelength and output an optical signal inputted from the optical transmission line to the optical signal receiverregardless of the wavelength, and the management control device allocates wavelengths so that a transmission wavelength of the subscriber device becomes a reception wavelength of the other subscriber device and a transmission wavelength of the other subscriber device becomes a reception wavelength of the subscriber device, wherein the outputter is an optical multiplexing/demultiplexing unit, the optical multiplexing/demultiplexing unit has a first port, a second port and a third port, the first port is connected to the optical signal transmitter, the second port is connected to the optical signal receiver, the third port is connected to the optical transmission line, and the optical multiplexing/demultiplexing unit outputs an optical signal inputted to at least the first port to the optical transmission line connected to the third port, branches an optical signal inputted to the third port and outputs the branched optical signal to the optical signal transmitter connected to the first port and the optical signal receiver connected to the second port, wherein the subscriber device further comprises a signal insulator configured to pass an optical signal in a first direction from the optical signal transmitter to the optical multiplexing/demultiplexing unit and cuts off an optical signal in a second direction from the optical multiplexing/demultiplexing unit to the optical signal transmitter between the optical signal transmitter and the optical multiplexing/demultiplexing unit.

2. The optical communication system according to claim 1, wherein the subscriber device further comprises a wavelength variable selector configured to pass an optical signal having a wavelength in a preset wavelength range between the optical signal receiver and the optical multiplexing/demultiplexing unit.

3. An optical communication method in an optical communication system comprising a subscriber device and a management control device that optically connects the subscriber device and other communicating subscriber device by End-End and controls each subscriber device, wherein allocating, by the management control device, wavelengths so that a transmission wavelength of the subscriber device becomes a reception wavelength of the other subscriber device and a transmission wavelength of the other subscriber device becomes a reception wavelength of the subscriber device, and outputting, by the subscriber device, an optical signal to an optical transmission line regardless of a wavelength, receiving, by the other subscriber device, the optical signal transmitted from the subscriber device via the optical transmission line, and outputting, by the other subscriber device, the optical signal inputted from the optical transmission line to an optical signal receiverregardless of the wavelength, wherein the outputter is an optical multiplexing/demultiplexing unit, the optical multiplexing/demultiplexing unit has a first port, a second port and a third port, the first port is connected to the optical signal transmitter, the second port is connected to the optical signal receiver, the third port is connected to the optical transmission line, and outputting, by the optical multiplexing/demultiplexing unit, an optical signal inputted to at least the first port to the optical transmission line connected to the third port, branching, by the optical multiplexing/demultiplexing unit, an optical signal inputted to the third port and outputting, by the optical multiplexing/demultiplexing unit, the branched optical signal to the optical signal transmitter connected to the first port and the optical signal receiver connected to the second port, passing, by a signal insulator included in the subscriber device, an optical signal in a first direction from the optical signal transmitter to the optical multiplexing/demultiplexing unit and cutting, by the signal insulator included in the subscriber device, off an optical signal in a second direction from the optical multiplexing/demultiplexing unit to the optical signal transmitter between the optical signal transmitter and the optical multiplexing/demultiplexing unit.

* * * * *